United States Patent
Hilfiker et al.

(10) Patent No.: US 11,470,083 B2
(45) Date of Patent: *Oct. 11, 2022

(54) DEVICE INTEGRATION FOR A NETWORK ACCESS CONTROL SERVER BASED ON DEVICE MAPPINGS AND TESTING VERIFICATION

(71) Applicant: Fortinet, Inc., Sunnyvale, CA (US)

(72) Inventors: Jeffrey S. Hilfiker, Barrington, NH (US); Eric P. Dupont, Nashua, NH (US)

(73) Assignee: Fortinet, Inc., Sunnyvale, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/902,980

(22) Filed: Jun. 16, 2020

(65) Prior Publication Data
US 2020/0314098 A1    Oct. 1, 2020

Related U.S. Application Data

(63) Continuation of application No. 16/154,838, filed on Oct. 9, 2018, now abandoned.
(Continued)

(51) Int. Cl.
*H04L 9/40* (2022.01)
*H04L 41/14* (2022.01)
(Continued)

(52) U.S. Cl.
CPC .......... *H04L 63/0876* (2013.01); *G06F 16/86* (2019.01); *H04L 41/145* (2013.01);
(Continued)

(58) Field of Classification Search
CPC ... H04L 63/0876; H04L 41/145; H04L 63/20; H04L 63/10; G06F 16/86; H04W 12/08
See application file for complete search history.

(56) References Cited

U.S. PATENT DOCUMENTS 6,098,116 A * 8/2000 Nixon ................ G05B 19/0426
709/220
6,389,464 B1 * 5/2002 Krishnamurthy ... H04L 41/0213
709/220
(Continued)

OTHER PUBLICATIONS

IP.com Search Query; Jul. 27, 2020 (Year: 2020).*
(Continued)

*Primary Examiner* — Taghi T Arani
*Assistant Examiner* — Blake I Narramore
(74) *Attorney, Agent, or Firm* — HDC Intellectual Property Law, LLP

(57) ABSTRACT

Systems and methods for facilitating self-service device integration for a NAC server is provided. According to one embodiment, a database is maintained by a NAC server. The database includes mappings of system object identifiers to corresponding implementation details of associated devices. A system object identifier of a device that is to be modeled within the NAC server based on implementation details of another device is received. A list of candidate devices is retrieved from the database based on the system object identifier. A user of the NAC server is prompted to select a candidate device from the list. Responsive to receipt of the selected candidate device, implementation details of the selected candidate device are mapped against the system object identifier and access to the network device is facilitated based on the implementation details of the selected candidate device by storing the mapping as an entry in the device database.

29 Claims, 12 Drawing Sheets

Related U.S. Application Data

(60) Provisional application No. 62/739,182, filed on Sep. 29, 2018.

(51) Int. Cl.
*H04W 12/08* (2021.01)
*G06F 16/84* (2019.01)

(52) U.S. Cl.
CPC .............. *H04L 63/10* (2013.01); *H04L 63/20* (2013.01); *H04W 12/08* (2013.01)

(56) References Cited

U.S. PATENT DOCUMENTS

| | | | | |
|---|---|---|---|---|
| 7,515,546 | B2* | 4/2009 | Gaspard | H04L 41/0213 |
| | | | | 370/252 |
| 7,580,936 | B2* | 8/2009 | Salgado | H04L 12/66 |
| 7,770,217 | B2* | 8/2010 | Pueblas | H04L 67/06 |
| | | | | 726/13 |
| 8,838,981 | B2* | 9/2014 | Ureche | H04L 9/3247 |
| | | | | 713/176 |
| 9,072,026 | B1* | 6/2015 | Singh | H04W 48/04 |
| 9,210,193 | B2 | 12/2015 | Nedbal et al. | |
| 9,288,199 | B1* | 3/2016 | Winn | H04L 63/10 |
| 9,461,980 | B1* | 10/2016 | Agrawal | H04L 63/08 |
| 2008/0126557 | A1* | 5/2008 | Motoyama | H04L 67/125 |
| | | | | 709/232 |
| 2008/0222285 | A1* | 9/2008 | Hickey | H04L 67/36 |
| | | | | 709/224 |
| 2009/0254392 | A1* | 10/2009 | Zander | H04L 63/20 |
| | | | | 705/50 |
| 2009/0307753 | A1* | 12/2009 | Dupont | H04L 63/0272 |
| | | | | 726/3 |
| 2010/0050241 | A1* | 2/2010 | Yan | H04L 63/104 |
| | | | | 726/5 |
| 2011/0282936 | A1* | 11/2011 | Chekhanovskiy | H04W 12/06 |
| | | | | 709/203 |
| 2012/0040690 | A1* | 2/2012 | Zhao | H04L 61/2084 |
| | | | | 455/456.1 |
| 2012/0117622 | A1* | 5/2012 | Gronholm | H04L 63/105 |
| | | | | 726/3 |
| 2013/0145000 | A1* | 6/2013 | Meyer | H04L 61/2084 |
| | | | | 709/222 |
| 2013/0332982 | A1 | 12/2013 | Rao et al. | |
| 2016/0219500 | A1* | 7/2016 | Hanson | H04L 63/0853 |
| 2016/0315940 | A1* | 10/2016 | Copsey | H04L 47/803 |
| 2016/0344773 | A1* | 11/2016 | Knjazihhin | G06F 21/604 |
| 2017/0026774 | A1* | 1/2017 | Koshimizu | H04W 4/14 |
| 2019/0052659 | A1* | 2/2019 | Weingarten | H04L 63/205 |
| 2019/0235909 | A1* | 8/2019 | Jin | H04L 41/046 |
| 2019/0342289 | A1* | 11/2019 | Zhu | H04W 12/06 |

OTHER PUBLICATIONS

Non-Final Office Action for U.S. Appl. No. 16/153,951, dated May 15, 2020, 14 pages.

Non-Final Office Action for U.S. Appl. No. 16/154,838, dated Apr. 3, 2020, 29 pages.

* cited by examiner

400

Add Device  ☒

Add to Container : [Switches ▼]

IP Address : [        ]

SNMP Setting

SNMP Protocol : [SNMPv1 ▼]

Security String : [        ]

CLI Setting

User Name : [        ]

Password : [        ]

Enable Password : [        ]

Protocol Type : [SSH 2 ▼]

[Validate Credentials]

[OK]   [Cancel]

Device Mapping  [x]

Name: HP-2530.8.2
OID: 1.3.6.1.4.1.11.2.3.7.11.147
Description: HP J9783A 2530.8 Switch, revision YB.15.16.0006, ROM YB.15.07 (/ws/swbuild
Standard Bridge MIB: Yes
Standard VLAN MIB: Yes
Standard IP MIB: Yes
Current Mapping:

○ Model this device as a Generic SNMP Device (?)
○ Model this Device as a: [Alarm System ▼] (?)
⦿ Model this OID from an Existing Device (?)
Device Model: [                    ] (?)

| Device Mappings -- Total: 145 | |
|---|---|
| Device OID | Device Model |
| 1.3.6.1.4.1.11.2.3.7.11.18 | HP ProCurve Switch 2512 |
| 1.3.6.1.4.1.11.2.3.7.11.19 | HP ProCurve Switch 2524 |
| 1.3.6.1.4.1.11.2.3.7.11.173 | HP ProCurve Switch 2530-8-PoEP |
| ⋮ | ⋮ |

[ OK ]  [ Cancel ]

Email Setting

Email Server: [                    ] (?)
Sender Email: [                    ] (?)
☐ Authentication (?)
Port: [25] (?)
Connectivity Security: [None ▼] (?)
☐ Advanced ( Test Email Setting )

FIG. 4C

DEVICE INTEGRATION FOR A NETWORK ACCESS CONTROL SERVER BASED ON DEVICE MAPPINGS AND TESTING VERIFICATION

CROSS-REFERENCE TO RELATED APPLICATIONS

This application is a continuation of U.S. patent application Ser. No. 16/154,838 filed on Oct. 9, 2018, which claims the benefit of U.S. Provisional Application No. 62/739,182 filed on Sep. 29, 2018, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018-2020, Fortinet, Inc.

BACKGROUND

Field

Embodiments of the present invention generally relate to network security. In particular, embodiments of the present invention relate to facilitating self-service device integration for a network access control (NAC) server that internally models network devices based on their respective system object identifiers (e.g., the sysObjectID attribute of the second version of the Management Information Base (MIB-II or MIB2) for use with network management protocols, such as Simple Network Management Protocol (SNMP)).

Description of the Related Art

Network Access Control (NAC) servers provide visibility into and control access to private networks (e.g., enterprise networks). A NAC server exerts access control by managing hosts at the edge of the private network. In order to accomplish this, the NAC server needs to be able to manage the network infrastructure at the edge of the private network. In the context of a wired network, NAC relies on, among other things, the ability to manage Virtual Local Area Networks (VLANs) at the port level, the ability to read OSI layer 2 (L2) data from an edge device to determine what hosts are connected to the ports and the ability to read OSI layer 3 (L3) data. Similarly, in a wireless network, NAC relies upon, among other things, the ability to retrieve connected host information, Service Set Identifier (SSID) information, and Access Point (AP) information.

In order to implement network management, current techniques adopted by NAC servers allow identification/discovery of connected devices. Existing NAC servers may perform network discovery by recognizing devices based on their respective unique identifiers, such as the sysObjectID attribute of the second version of the Management Information Base (MIB-II or MIB2) for use with network management protocols. MIB2 is described in Request for Comments 1213, which is hereby incorporated by reference for all purposes. The system object identifier for each device is read in order to model the device and inform the NAC how to properly communicate with and access information from the device. Currently, network infrastructure vendors provide many different models and configurations for various devices that may be managed identically by a NAC server as some model and/or configuration changes do not affect NAC interactions. In order to discover each of these devices, device mappings are created, which relate the system object identifier with implementation details for management of the corresponding network device by the NAC server.

At present, integration of network devices with NAC servers is a complex manually performed technological process, involving the creation of appropriate device mappings for identification and appropriate internal modeling of the network devices by the NAC server that is performed by skilled engineers. For some NAC servers, this mapping process involves modifying internal property files maintained by the NAC server that define how network devices are to be managed. This is laborious, and not possible for non-engineers to accomplish. As a result, NAC server vendors spend a lot of time creating these mappings. Additionally, as is to be expected, device integration issues commonly arise when performing a proof of concept (POC) for a prospective customer or a new installation for a customer within their private network, thereby resulting in a potentially painful and lengthy process requiring the physical presence and assistance of an engineer for any hope of the POC or new installation going smoothly. Moreover, for larger network environments including a variety of network devices, the task of creating appropriate device mappings and/or associated property files becomes increasingly complex and unmanageable.

In view of the foregoing, there is a need in the art for a technological solution that addresses the limitations associated with integration of network devices with NAC servers.

SUMMARY

Systems and methods are described for facilitating self-service device integration for a network access control (NAC) server. According to one embodiment, a device database is maintained by a network access control (NAC) server that protects a private network. The device database includes mappings of each of multiple system object identifiers with corresponding implementation details of associated devices. A system object identifier of a device that is to be modeled within the NAC server based on implementation details of another device is received. A list of one or more candidate devices is retrieved from the device database based on the system object identifier. A user of the NAC server is prompted to select a candidate device from the list. Responsive to receipt of information regarding the selected candidate device, implementation details of the selected candidate device are mapped against the system object identifier and access to the network device is facilitated based on the implementation details of the selected candidate device by storing the mapping as an entry in the device database.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 4A-D illustrate various pages of a graphical user interface of a NAC server presented to a NAC user to facilitate self-service device integration and modeling of a network device in accordance with an embodiment of the present invention.

DETAILED DESCRIPTION

Figure 1:
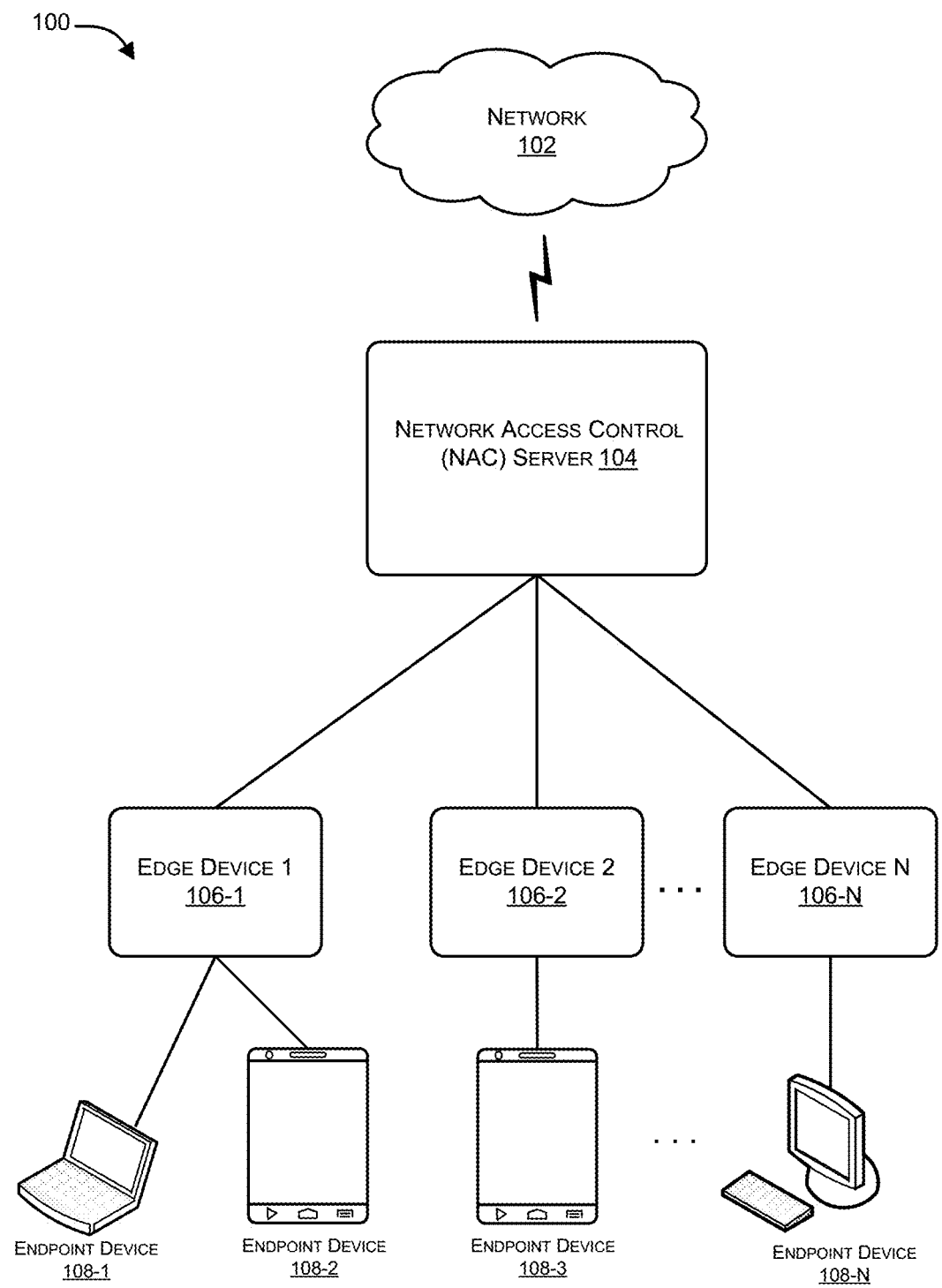
FIG. 1 illustrates a simplified network architecture in which aspects of the present invention can be implemented in accordance with an embodiment of the present invention.

Systems and methods are described for facilitating self-service device integration for a network access control (NAC) server. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances, NAC appliances/servers and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

In the context of the present disclosure, those skilled in the art will appreciate self-service device integration for a network access control (NAC) server involves the ability of a NAC user (e.g., an administrator of the NAC server) to add network device mappings to the NAC server. According to various embodiments disclosed herein, this self-service feature is facilitated by reading a system object identifier from the network device such that if the system object identifier (and thus, the network device) is unknown to the NAC server, a NAC user can be provided with mappings of a number of possible network devices such that the NAC user can select from the possibilities a best possible match. Once the NAC user has selected a potential network device that he/she assumes could be a possible match, mapping can be created by copying integration details from mapping of the potential network device. Such a technique effectively integrates a new network device mapping with system object identifier as the identifier. The approach disclosed herein differs significantly from existing approaches of device integration that kept all such integration processes hidden from NAC users and often required creation of new property files for new network device models/configurations. Thus, the approach disclosed herein can significantly reduce the number of support calls required for device integration, and can facilitate successful new installations and proofs of concept (POCs) without the need for a skilled engineer to be present.

FIG. 1 illustrates a simplified network architecture 100 in which aspects of the present invention can be implemented in accordance with an embodiment of the present invention.

According to an embodiment, a NAC server 104 protects a private network that can include network devices such as edge devices 106-1, 106-2 . . . 106-N (which may be collectively referred to as edge devices 106 and individually referred to as edge device 106, hereinafter) and endpoint devices 108-1, 108-2 . . . 108-N (which may be collectively referred to as endpoint devices 108 and individually referred to as endpoint device 108, hereinafter). Edge devices 106 are devices, which provide entry points into the private network. Non-limiting examples of edge devices 106 include routers, switches, network gateway devices, Wi-Fi access points, access devices, integrated access devices (IADs), multiplexers, a variety of metropolitan area network (MAN) and wide area network (WAN) access devices, and the like. NAC server 104 can be communicatively coupled with a public network 102, such as the Internet, so that the user can access the network 102 using endpoint devices 108 through corresponding edge devices 106. Examples of endpoint devices 108 can include, but are not limited to, personal computers, smart devices, web-enabled devices, hand-held devices, laptops, mobile phones and the like.

Those skilled in the art will appreciate that various networks in architecture 100 can include wireless networks, wired networks or a combination thereof that can be implemented as one of the different types of networks, such as Intranet, Local Area Network (LAN), Wide Area Network (WAN), Internet, and the like. Further, the networks can either be dedicated networks or shared networks. The shared networks represent an association of the different types of networks that use a variety of protocols, for example, Hypertext Transfer Protocol (HTTP), Transmission Control Protocol/Internet Protocol (TCP/IP), Wireless Application Protocol (WAP), and the like.

Those skilled in the art will appreciate that while embodiments of the present disclosure are explained with reference to a particular type of network security device (e.g., a NAC server), the self-service device integration features described herein have applicability to other network security devices.

According to an embodiment, when a network device, e.g. edge device 106, is required to be integrated in the private network, an enforcement engine running on the NAC server 104 can initialize modeling of the network device that is operatively coupled with NAC server 104 by reading a system object identifier associated with the network device. Further, a device information database can be maintained by the NAC server 104 that can include a mapping of system object identifiers of various network devices with corresponding implementation details relating to how to access the needed L2, L3, SSID, VLAN information and the like from the network device at issue. In one embodiment, the database is maintained by extracting device mapping information from property files stored in the NAC server 104. For example, on startup of the NAC server 104, device mapping information can be read from the property files and can be added to the database such that the mapping information can be used from the database instead of pulling in the information from the resource manager or property files.

Thus, after reading the system object identifier from the network device at issue, the enforcement engine can query the database for the system object identifier in order to determine whether a mapping for the system object identifier exists in the database.

According to an embodiment, if a matching system object identifier is identified in the database, NAC server 104 can access the network device based on implementation details stored in database corresponding to the matching system object identifier. However, if a matching system object identifier is not found for the network device, NAC server 104 can retrieve a list of network devices from the database based on the system object identifier in order to enable the NAC user to select a potential network device from a list of devices. In an example, the list of network devices can be retrieved based on a vendor identifier extracted from the system object identifier. To enable the NAC user to select the potential network device, the list of network devices can include any or a combination of system object identifier, model name, firmware version and mapping information for each of the one or more network devices. In an example, the NAC user can search for the potential network device from the suggested list of network devices or search for the potential network device within the entire database based on a model name of the network device and/or search/filter based on other criteria.

When the NAC user selects the potential network device he/she believes might be a suitable representation for the network device at issue, the enforcement engine can map implementation details of the potential network device against the system object identifier of the network device at issue that is required to be integrated within the NAC server. This mapping can be stored as an entry in the database in order to access the network device using implementation details of the selected network device. Further, the enforcement engine can test successful modeling of the network device via the newly created mapping by reading certain data/information from the network device and allowing the NAC user an opportunity to verify that the data/information was retrieved correctly. For example, for an edge device on a wired network, Media Access Control (MAC) address information, port information, Internet Protocol (IP) address information, and/or Virtual Local Area Network (VLAN) information can be read from the network device and presented to the NAC user for visual verification. Similarly, for an edge device associated with a wireless network, host information, Service Set Identifier (SSID) information, Access Point (AP) information and/or the like can be read from the network device and presented to the NAC user for visual verification. In this manner, the NAC user can confirm that the selected mapping is correctly modeling the network device for purposes of information retrieval. If the test fails, the NAC user can direct the enforcement engine to remove/delete the newly created entry pertaining to the system object identifier from the database and can select another potential network device from the list of network devices to model the network device. The tests can be repeated and alternative network devices can be selected from the list until the NAC user is satisfied with the testing results.

According to an embodiment, on creation of an entry or on successful testing, the network device modeling engine can notify the NAC development team of the vendor of the NAC server. For example, addition of the entry, including information about the mapping can be notified to the NAC development team so that the mapping can be added to device information databases for subsequent NAC deployments. Thus, when this newly integrated network device is encountered by a subsequent NAC deployment, the subsequent NAC deployment can benefit from the self-service device integration efforts of others that have been incorporated by the NAC development team. The notification can be accomplished through a built in e-mail client of the NAC server that can allow the NAC server to send e-mails automatically (assuming developer feedback settings are configured appropriately and/or the NAC user authorizes the sharing of such information).

Figure 2:
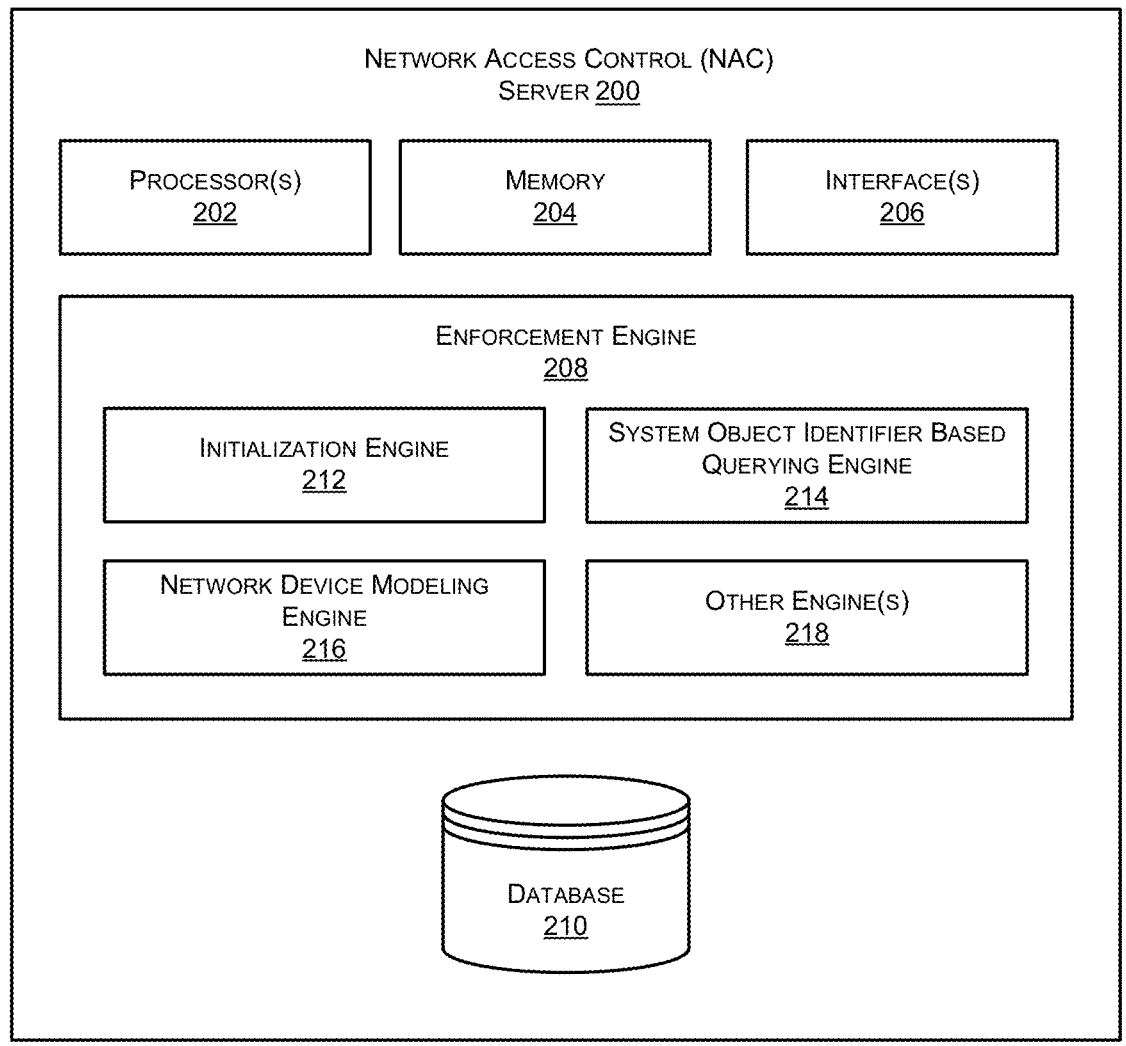
FIG. 2 illustrates exemplary functional components of a network access control (NAC) server in accordance with an embodiment of the present invention.

FIG. 2 illustrates exemplary functional components of a network access control (NAC) server 200 in accordance with an embodiment of the present invention. In the context of the present example, NAC server 104 includes one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of NAC server 104. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

NAC server 104 can also include one or more interface(s) 206. Interface(s) 206 may include a variety of interfaces, for example, interfaces for data input and output devices, referred to as I/O devices, storage devices, and the like. Interface(s) 206 may facilitate communication of NAC server 104 with various devices coupled to NAC server 104. Interface(s) 206 may also provide a communication pathway for one or more components of NAC server 104. Examples of such components include, but are not limited to, enforcement engine 208 and database 210.

Enforcement engine 208 can be implemented as a combination of hardware and software or firmware programming (for example, programmable instructions) to implement one or more functionalities of engine 208. In the examples described herein, such combinations of hardware and software or firmware programming may be implemented in several different ways. For example, the programming for the engine may be processor executable instructions stored on a non-transitory machine-readable storage medium and the hardware for engine 208 may include a processing resource (for example, one or more processors), to execute such instructions. In the examples, the machine-readable storage medium may store instructions that, when executed by the processing resource, implement engine 208. In such examples, NAC server 104 can include the machine-readable storage medium storing the instructions and the processing resource to execute the instructions, or the machine-readable storage medium may be separate but accessible to NAC server 104 and the processing resource. In other examples, enforcement engine 208 may be implemented by electronic circuitry. Database 210 can include data that is either stored or generated as a result of functionalities implemented by any of the components of enforcement engine 208 e.g. device information database that can be maintained by extracting device mapping information from one or more property files stored in NAC server 104.

In an example, enforcement engine 208 can include an initialization engine 212, a system object identifier based querying engine 214, a network device modeling engine 216 and other engine(s) 218. Other engine(s) 218 can implement functionalities that supplement applications or functions performed by NAC server 104 or enforcement engine 208.

According to an embodiment, initialization engine 212 can initialize modeling of a network device that is operatively coupled with NAC server 104 by reading a system object identifier associated with the network device. The network device can be any type of wired or wireless edge device, including, but not limited to, a switch, a router, a network gateway and the like.

According to an embodiment, database 210 can include a mapping of system object identifiers of various network devices with corresponding implementation details of associated network devices. System object identifier based querying engine 214 can query the database 210 for the system object identifier of the network device in order to determine whether a mapping for the system object identifier exists in the database According to an embodiment, network device modeling engine 216 can identify a matching system object identifier stored in database 210 based on the query. If a matching system object identifier is found in database 210, network device modeling engine 216 can access the network device based on implementation details stored in database 210 corresponding to the matching system object identifier. However, if a matching system object identifier is not found in database 210, network device modeling engine 216 can retrieve a list of candidate network devices from database 210 that might be suitable for modeling the network device at issue based on its system object identifier. This list of candidate network devices can be presented to the NAC user to enable the NAC user to select a potential network device from the list. In an example, the list of network devices can be retrieved based on a vendor identifier extracted from the system object identifier. To enable the NAC user to select the potential network device, the list of network devices can include any or a combination of system object identifier, model name, firmware version and mapping information of each of the network devices. In an example, the NAC user can search for a potential network device from the list of network devices based on a model name of the network device.

When the NAC user selects the potential network device, network device modeling engine 216 can map implementation details of the potential network device against the system object identifier obtained for the network device that is required to be integrated such that the mapping can be stored as an entry in database 210 in order to access the network device using implementation details of the potential network device.

According to an embodiment, other engine 218 can include a testing engine, which can perform one or more tests to allow the NAC user to determine whether the newly created mapping results in a successful modeling of the network device. Such testing can be initiated responsive to storing of the new entry in database 210 or responsive to a request by the NAC user and can involve, for example, reading information/data from the network device, which can include MAC address information, port information, IP address information, VLAN information, host information, SSID information, AP information and the like.

According to an embodiment, if the test fails, the NAC user can trigger the testing engine to remove the corresponding entry pertaining to the system object identifier from database 210 and the NAC user can repeat the process by selecting another potential network device from the list of network devices and testing that subsequently selected potential network device until the testing results are satisfactory to the NAC user. As noted above, responsive to successful testing, the network device modeling engine can notify the NAC development team.

Figure 3A:
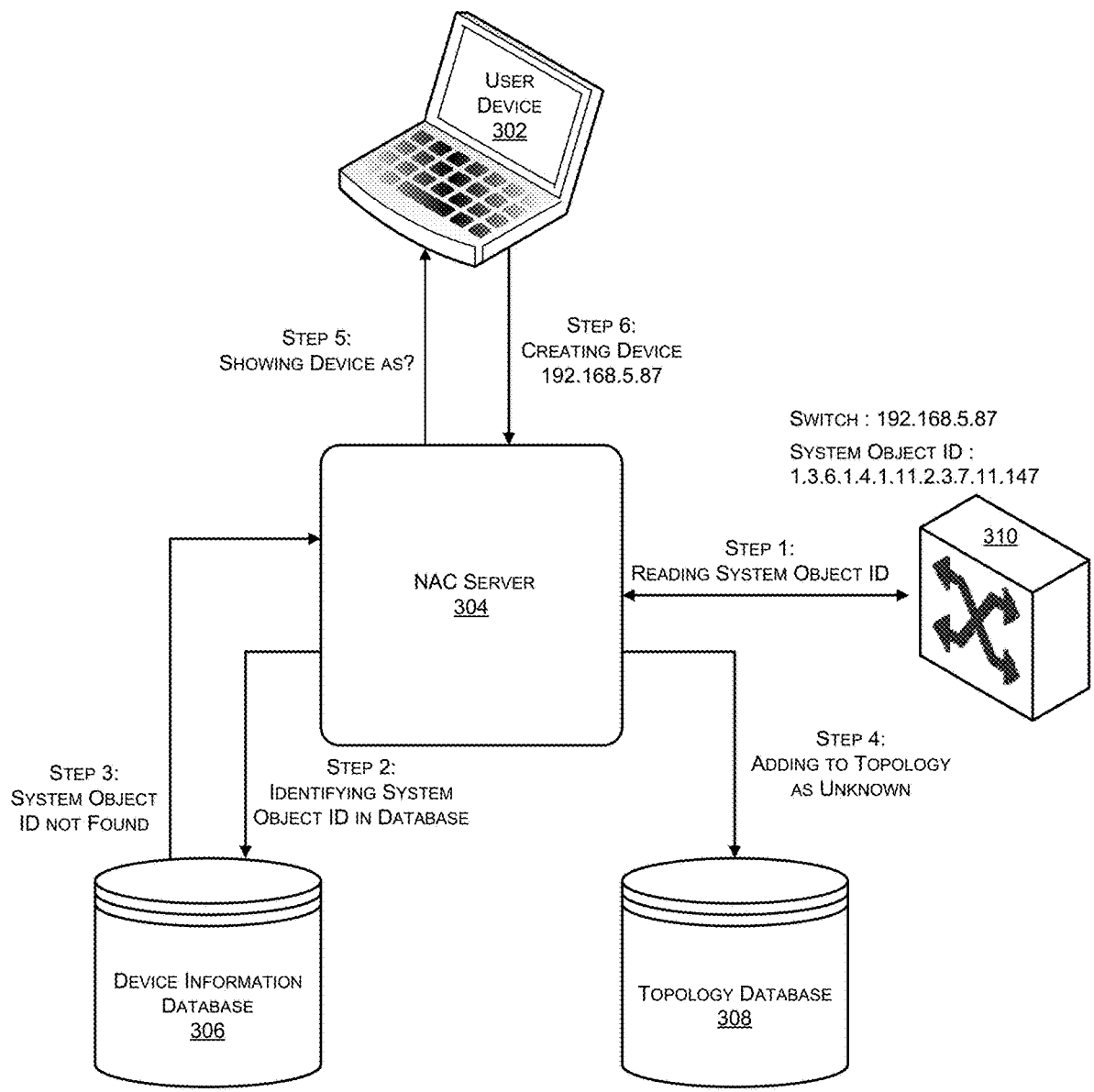
FIGS. 3A-C illustrate various example interactions in relation to modeling of a network device in accordance with an embodiment of the present disclosure.
Figure 3B:
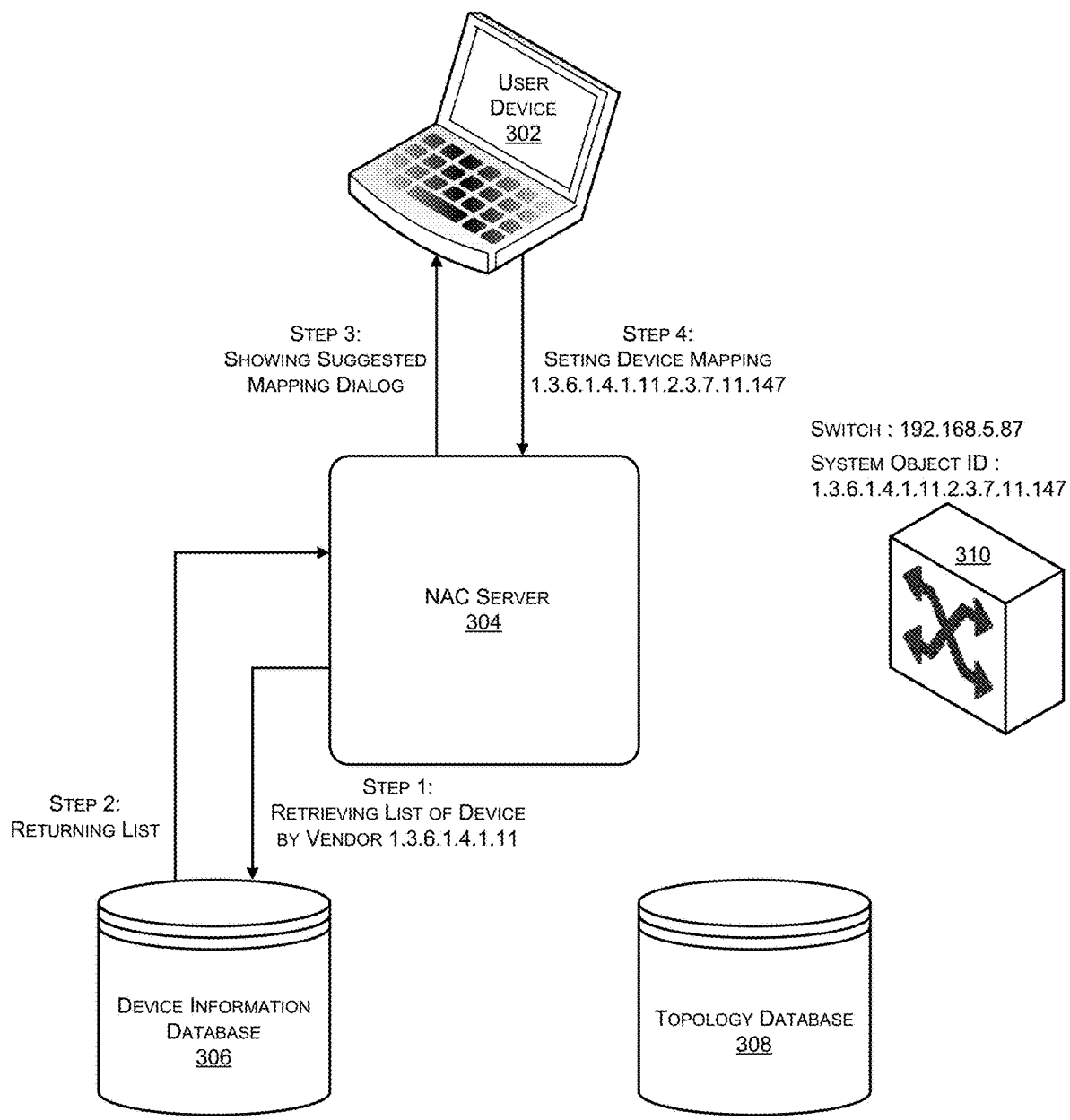
Figure 3C:
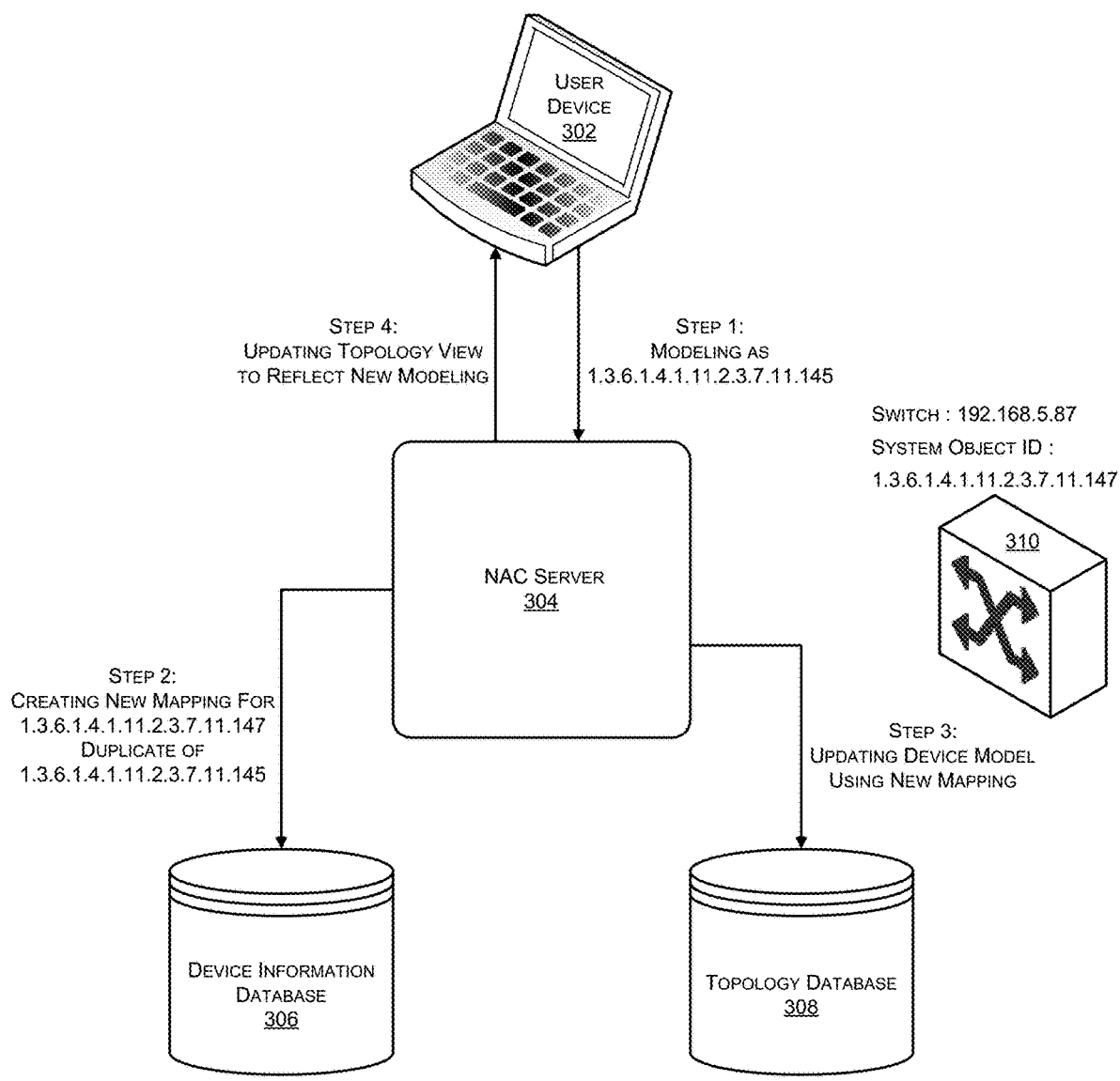

FIGS. 3A-C illustrate various example interactions in relation to modeling of a network device in accordance with an embodiment of the present disclosure.

With reference to example 300 as illustrated in FIG. 3A, at step 1, NAC server 304 can read the system object identifier of a network device (i.e., switch 310). At step 2, NAC server 304 can query device information database 306 for the system object identifier of network device 310. At step 3, NAC server 304 can be notified that the system object identifier is not found. At step 4, NAC server 304 may model the network device 310 as an Unknown device in the topology database 308. At step 5, the NAC user can be informed that network device 310 is unknown by, for example, displaying a "?" icon in the topology view for network device 310. At step 6, the NAC user can initiate creation of a device mapping for network device 310 via the topology view. Further processing is explained with reference to FIG. 3B.

With reference to example 330 as illustrated in FIG. 3B, after the NAC user initiates creation of a device mapping, at step 1 and step 2, NAC server 304 can retrieve a list of network devices based on a vendor identifier contained within the system object identifier of the network device 310. At step 3, the list is presented to the NAC user to facilitate selection of a mapping of a potential network device from the list to set the device mapping at step 4. Further process is explained with reference to FIG. 3C.

With reference to example 360 as illustrated in FIG. 3C, when the NAC user selects the mapping, at step 1, NAC server 304 can be notified to model network device 310 similar to the selected mapping. At step 2, NAC server 304 can create a new database entry for the unknown device by duplicating the mapping details of the mapping selected by the NAC user. At step 3, network device model can be updated using the new entry. At step 4, the topology view can be updated to reflect the new modeling.

FIGS. 4A-D illustrate various pages of a graphical user interface of a NAC server presented to a NAC user to facilitate self-service device integration and modeling of a network device in accordance with an embodiment of the present invention.

According to an embodiment, using page 400 as illustrated in FIG. 4A, the NAC user can specify a network device that is desired to be modeled in the NAC server either via a single device creation, or a network discovery. Further, the NAC server can query the database for system object identifier of the network device e.g. 1.3.6.1.2.1.1.2. The NAC server can look up the system object identifier in the device information database to determine if there is an existing mapping that defines how this device is managed. If there is a mapping corresponding to the system object identifier, the network device is modeled in accordance with the mapping and the device modeling process is complete. If the mapping does not exist, the NAC server can model the network device in the topology view as an Unknown device as indicated by a "?" icon, for example.

Further, using representation 430 as illustrated in FIG. 4B, the NAC user can be presented with an option to select a device mapping from a list of mappings presented. In an example, the following information can be presented to guide the NAC user:
1) sysObjectID i.e. system object identifier of the network device (which is an actual unique identifier)
2) sysDescription that describes the network device and vendor and can include model name and firmware version of the network device.
3) A table containing a list of existing device mappings, which can be obtained from the device information database using the vendor identifier of the network device that can be extracted from the sysObjectID read from the unknown device.

In the context of the example device mapping page 420 illustrated in FIG. 4B, a first portion (i.e., 1.3.6.1.4.1.11) of the sysObjectID (e.g., OID) represents the vendor identifier for all HP branded networking equipment and a second portion (i.e., 2.3.7.11.147) of the sysObjectID identifies a specific model of the device at issue. The NAC server can query the database to find all device mappings in the database that match the vendor identifier, for example, and present a list of the devices to the NAC user so that the NAC user can select a similar device. When the NAC user selects a mapping based on the information provided, the NAC server can create a new database entry for the unknown device by duplicating the mapping details of the mapping selected by the NAC user such that the device is now effectively modeled in the NAC server based on the selected device.

Figure 4D:
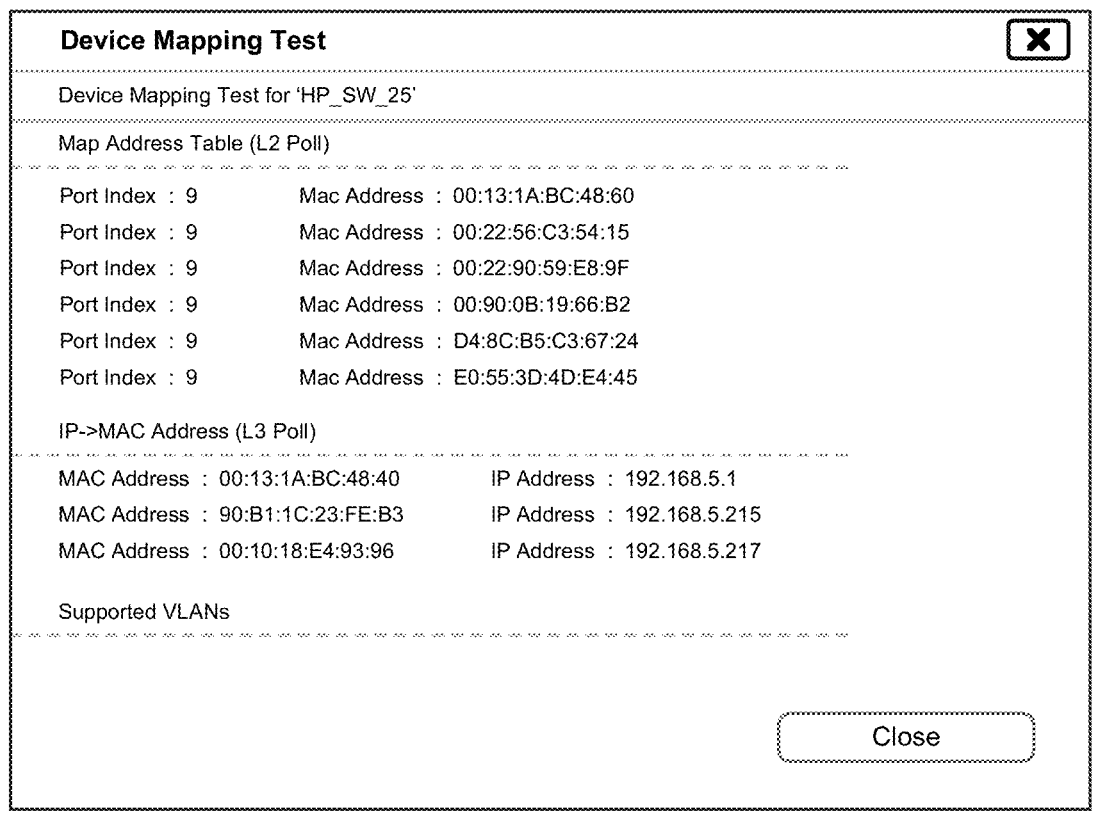

In the context of the present example, the NAC user can be provided with a mechanism to perform a simple set of tests to determine whether the selected mapping is suitable for modeling the network device. There can be a Test Device Mapping option (not shown), selection of this option (or selection of the "OK" button) can trigger a set of reads for some or all of the data that the NAC server would typically rely upon to do its job. In one embodiment, the testing of a wired edge device may include retrieving one or more of supported VLANs, OSI layer 2 (L2) data, and OSI layer 3 (L3) data. For example, the NAC server may use the selected mapping to read Media Access Control (MAC) Address information from the network device to determine what hosts are connected to the ports, to read MAC address to Internet Protocol (IP) address mappings and/or to read supported VLANs. Similarly, for a wireless network edge device, the NAC server may use the selected mapping to retrieve connected host information, Service Set Identifier (SSID) information, and Access Point (AP) information. The data/information read from the network device can be presented to the NAC user in another dialog or page 480 as illustrated in FIG. 4D. If the device mapping functions as expected (e.g., the information retrieved from the network device matches what the expected values), then the NAC user can reasonably expect the selected mapping is suitable for modeling the network device. If the device mapping does not function as expected (e.g., one or more portions of the information retrieved from the network device do not match the expected values), then the NAC user can remove this device mapping and try another as described above.

FIG. 4C illustrates an email setting page 460 for configuration of an e-mail client associated with the NAC server so as to allow the information about newly created device mappings to be e-mailed to the NAC server development team. In one embodiment, a built in e-mail client in the NAC server can automatically generate and send an e-mail notifying the development team regarding new mappings so as to allow such new mappings to be added to device information databases distributed with future versions of the NAC server.

Figure 5:
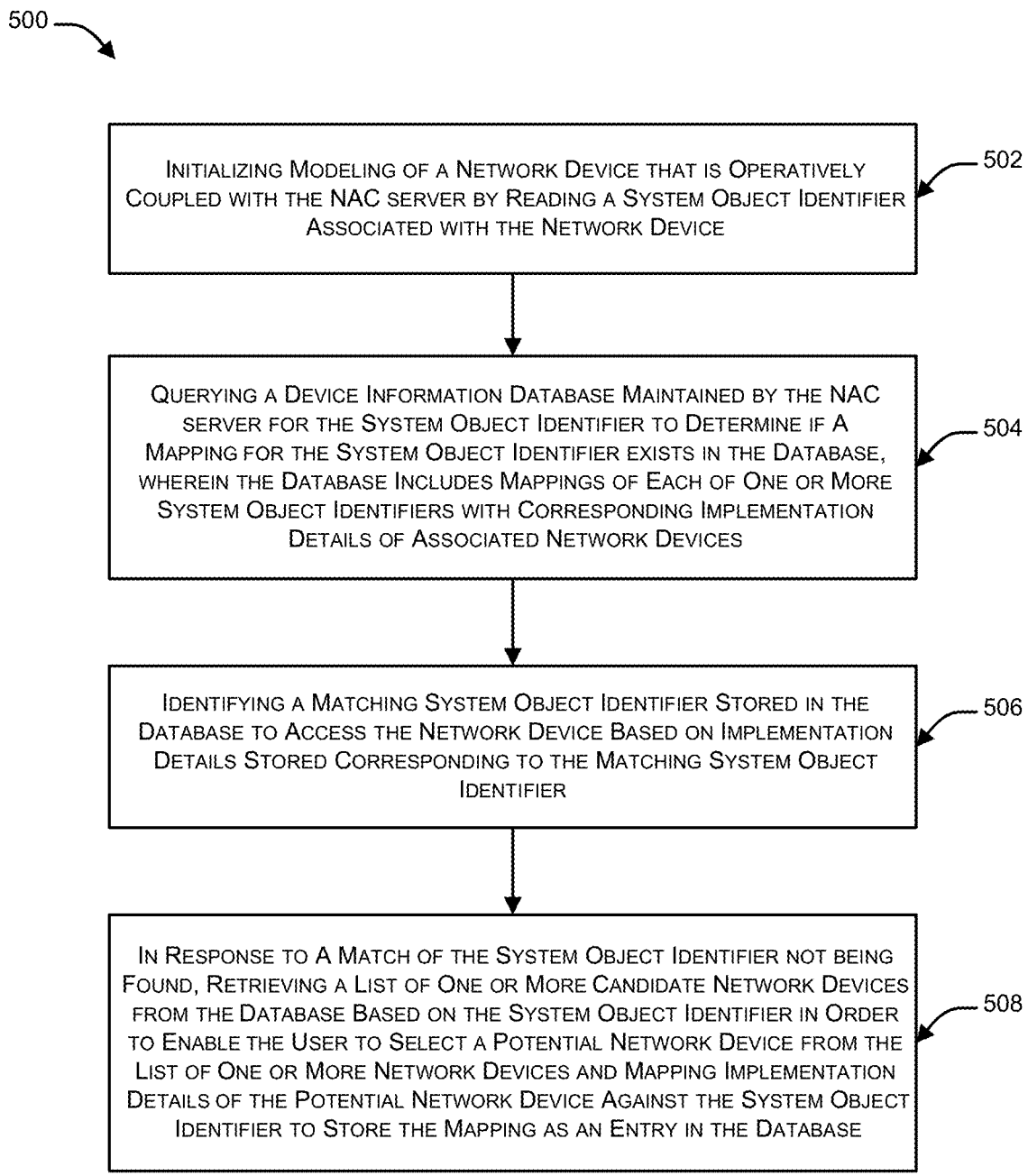
FIG. 5 is a high-level flow diagram illustrating a process for modeling a network device in accordance with an embodiment of the present invention.

FIG. 5 is a high-level flow diagram 500 illustrating a process for modeling a network device in accordance with an embodiment of the present invention.

In the context of the present example, at block 502, an enforcement engine running on a NAC server protecting a private network can initialize modeling of a network device that is within the private network by reading a system object identifier associated with the network device.

At block 504, the enforcement engine can query a device information database maintained by the NAC server to determine whether a mapping for the system object identifier exists in the database. Those skilled in the art will appreciate that the database includes mappings of multiple system object identifiers with corresponding implementation details of associated network devices.

At block 506, the enforcement engine can identify a matching system object identifier stored in the database. When a matching system object identifier is identified, the network device is a recognized device and can be accessed based on the implementation details corresponding to the matched system object identifier and modeling of the network device is complete.

At block 508, when a matching system object identifier is not found in the database, the network device is treated as an unknown device. The enforcement engine retrieves a list of potentially related network devices from the database based on the system object identifier in order to enable the NAC user to select a network device from the list to be used to model the unknown device. Further, the enforcement engine can map the implementation details of the selected network device to the system object identifier and store the mapping as an entry in the database in order to facilitate subsequent access the network device using the implementation details of the selected network device.

Figure 6:
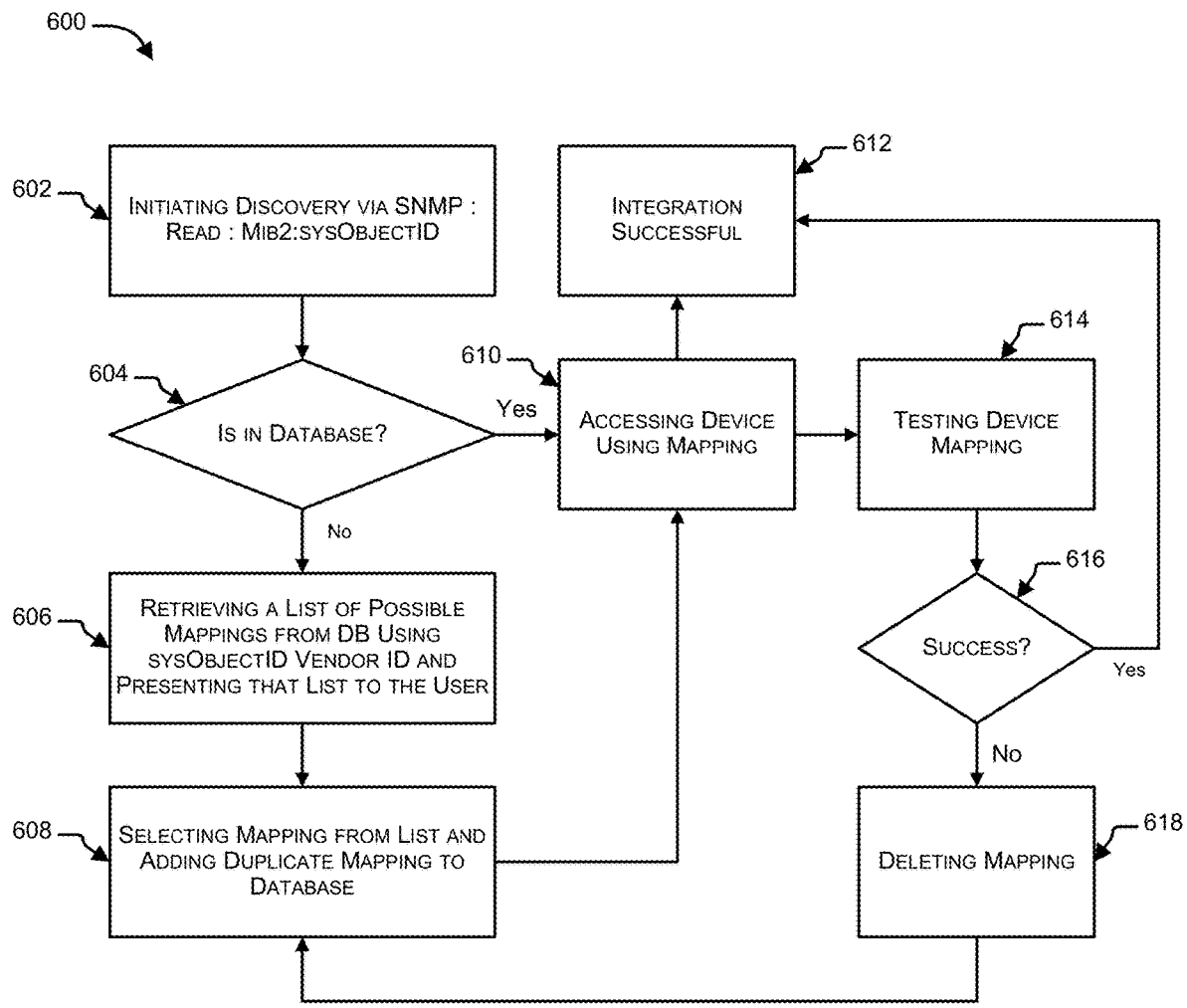
FIG. 6 is a high-level block diagram illustrating exemplary processing performed by a NAC server in accordance with an embodiment of the present invention.

FIG. 6 is a high-level block diagram 600 illustrating exemplary processing performed by a NAC server in accordance with an embodiment of the present invention.

In the context of the present example, at block 602, an enforcement engine running on a NAC server protecting a private network can initiate discovery of a particular network device within the private network by reading a system object identifier associated with the network device. At block 604, the enforcement engine can query a device information database for the system object identifier to determine whether a mapping for the system object identifier exists in the database. The database can include mappings of various system object identifiers with corresponding implementation details of associated known network devices.

At block 610, if a matching system object identifier is found in the database, the network device can be accessed based on implementation details associated with the matched system object identifier such that at block 612 modeling of the network device is successful. Conversely, when a matching system object identifier is not found in the database, at block 606 the enforcement engine can retrieve a list of candidate mappings using a vendor identifier extracted from the system object identifier to present to the NAC user a list of potential network devices that might be suitable for modeling the unknown network device. Further, at block 608, the NAC user can select a potential mapping by selecting a network device from the list of potential network devices. Responsive to the selection, the enforcement engine can map the implementation details of the selected network device to the system object identifier by, for example, creating a duplicate of the selected network device database entry and storing it as a new entry in the database for the system object identifier.

Furthermore, in an exemplary embodiment, at block 610, after storing the new entry, the enforcement engine can attempt to access the network device using the newly created mapping of the system object identifier so that at block 614, the newly created mapping can be tested on the network device. In one embodiment, the testing facilitates visual confirmation by the NAC user of information retrieved from the network device to allow the NAC user to confirm the newly created mapping is compatible with the network device for purposes of modeling of the network device by the NAC server. For example, based on the newly created mapping, the NAC server can read data/information, including, but not limited to, MAC address information, port information, IP address information, VLAN information, host information, SSID information, AP information and the like, from the network device.

At block 616, the enforcement engine can receive input from the NAC user regarding whether the testing was successful, if the testing was successful, at block 612, the process is complete. However, if the testing was not successful, at block 618, the NAC user can cause the enforcement engine to delete the created mapping and, at block 608, the enforcement engine can allow the NAC user to repeat the process by looping back to block 608 and repeating the selection process and testing process until a suitable network device is identified within the database for modeling the unknown network device.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 7:
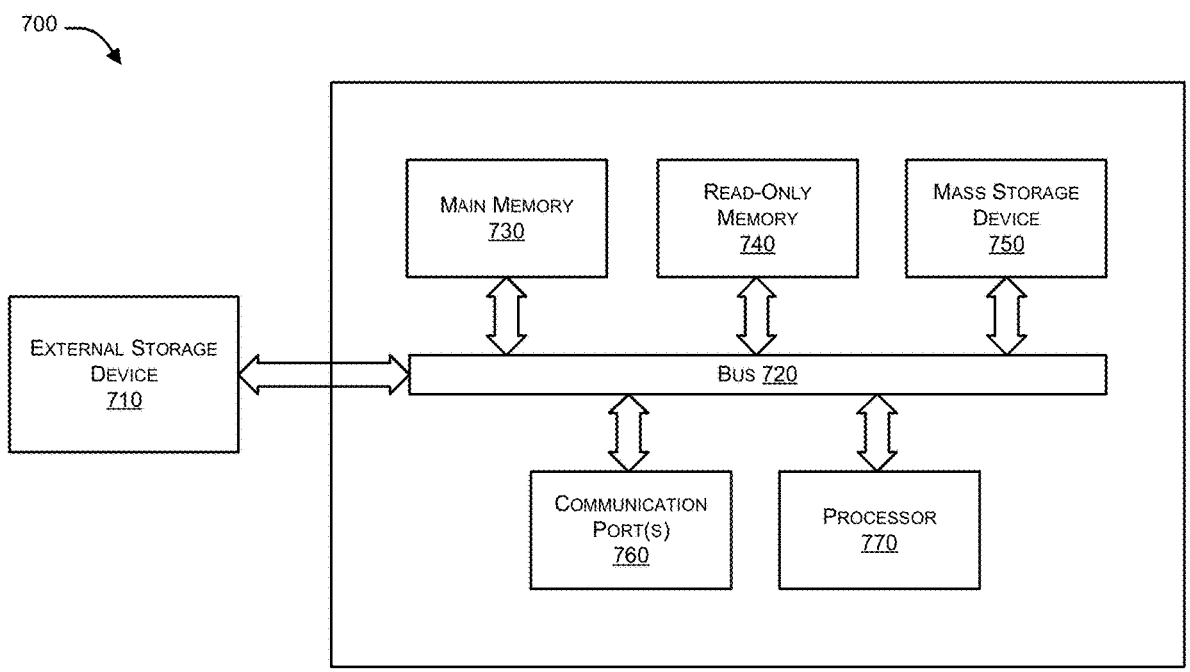
FIG. 7 illustrates an exemplary computer system in which or with which embodiments of the present invention may be utilized.

FIG. 7 illustrates an exemplary computer system 700 in which or with which embodiments of the present invention may be utilized. Computer system 700 may represent a NAC server (e.g., NAC server 104) or a portion of a NAC server.

As shown in FIG. 7, computer system 700, includes an external storage device 710, a bus 720, a main memory 730, a read only memory 740, a mass storage device 750, a communication port 760, and a processor 770.

Those skilled in the art will appreciate that computer system 700 may include more than one processor 770 and communication ports 760. Examples of processor 770 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 770 may include various modules associated with embodiments of the present invention.

Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects.

Memory 730 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with computer system. Other operator and administrative interfaces can be provided through network connections connected through communication port 760. External storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   maintaining, by a processor of a network access control (NAC) server that protects a private network including a plurality of devices apart from the NAC server, a device database apart from any of the plurality of devices including mappings of each of a plurality of system object identifiers to corresponding implementation details of associated devices, wherein each system object identifier of the plurality of system object identifiers contains information indicative of one or both of a vendor of the associated device and a model of the associated device;
   receiving, by the processor, a system object identifier of a device that is not recognized by the NAC server and is to be modeled within the NAC server based on implementation details of another device;
   retrieving, by the processor, a list of one or more candidate devices from the device database based on the system object identifier;
   prompting, by the processor, a user of the NAC server to select a candidate device from the list; and
   responsive to receipt of information regarding the selected candidate device, mapping, by the processor, implementation details of the selected candidate device against the system object identifier and facilitating access to the device using the implementation details of the selected candidate device by storing the mapping in the device database.

2. The method of claim 1, further comprising testing, by the processor, successful modeling of the device by the selected candidate device mapping by reading device information from the device.

3. The method of claim 2, wherein the device information comprises any or a combination of Media Access Control (MAC) address information, port information, Internet Protocol (IP) address information, Virtual Local Area Network (VLAN) information, host information, Service Set Identifier (SSID) information and Access Point (AP) information.

4. The method of claim 1, wherein the device comprises any of a switch, a router, an access device, or a network gateway device.

5. The method of claim 1, wherein the list of one or more candidate devices is retrieved based on a vendor identifier extracted from the system object identifier.

6. The method of claim 1, wherein said maintaining includes extracting device mapping information from one or more property files stored in the NAC server.

7. The method of claim 1, wherein the method further comprises notifying, by the processor, a NAC development team of the NAC server regarding the mapping.

8. The method of claim 1, wherein the list of one or more candidate devices includes for each of the one or more candidate devices any or a combination of a corresponding system object identifier, a corresponding model name, a corresponding firmware version and mapping information.

9. A network access control (NAC) server comprising:
   a processing resource apart from a plurality devices protected by the NAC server; and
   a non-transitory computer-readable medium, coupled to the processing resource, having stored therein instructions that when executed by the processing resource cause the processing resource to:
   maintain a device database apart from any of the plurality of devices and including mappings of each of a plurality of system object identifiers to corresponding implementation details of associated devices, wherein each system object identifier of the plurality of system object identifiers contains information indicative of one or both of a vendor of the associated device and a model of the associated device;
   receive a system object identifier of a device that is not recognized by the NAC server and is to be modeled within the NAC server based on implementation details of another device;
   retrieve a list of one or more candidate devices from the device database based on the system object identifier;
   prompt a user of the NAC server to select a candidate device from the list; and
   responsive to receipt of information regarding the selected candidate device, map implementation details of the selected candidate device against the system object identifier and facilitate access to the device using the implementation details of the selected candidate device by storing the mapping in the device database.

10. The NAC server of claim 9, wherein the instructions further cause the processing resource to test successful modeling of the device by the selected candidate device mapping by reading device information from the device.

11. The NAC server of claim 10, wherein the device information comprises any or a combination of Media Access Control (MAC) address information, port information, Internet Protocol (IP) address information, Virtual Local Area Network (VLAN) information, host information, Service Set Identifier (SSID) information and Access Point (AP) information.

12. The NAC server of claim 9, wherein the device comprises any of a switch, a router, an access device, or a network gateway device.

13. The NAC server of claim 9, wherein the list of one or more candidate devices is retrieved based on a vendor identifier extracted from the system object identifier.

14. The NAC server of claim 9, wherein the device database is maintained by extracting device mapping information from one or more property files stored in the NAC server.

15. The NAC server of claim 9, wherein the instructions further cause the processing resource to notify a NAC development team of the NAC server regarding the mapping.

16. The NAC server of claim 9, wherein the list of one or more candidate devices includes for each of the one or more candidate devices any or a combination of a corresponding system object identifier, a corresponding model name, a corresponding firmware version and mapping information.

17. The NAC server of claim 9, wherein the list is retrieved by selecting the one or more candidate devices based on the information indicative of the vendor contained within their respective system object identifiers of the plurality of system object identifiers matching information indicative of a vendor of the system object identifier of the device.

18. The NAC server of claim 9, wherein the plurality of system object identifiers comprise sysObjectID attributes.

19. The NAC server of claim 9, wherein the instructions further cause the processing resource to cause the user to be informed the device is not recognized by the NAC server.

20. The NAC server of claim 9, wherein the list is retrieved by selecting devices similar to the device based at least in part on the information indicative of a vendor of the device contained within the system object identifier and information indicative of a model of the device contained within the system object identifier.

21. The NAC server of claim 9, wherein said facilitating access comprises enabling reading of layer 2 data from the device to determine what hosts are connected to ports of the device.

22. A non-transitory computer-readable storage medium embodying a set of instructions, which when executed by a processing resource of a network access control (NAC) server protecting a private network including a plurality of devices apart from the NAC server causes the processing resource to:
maintain a device database apart from any of the plurality of devices and including mappings of each of a plurality of system object identifiers to corresponding implementation details of associated devices, wherein each system object identifier of the plurality of system object identifiers contains information indicative of one or both of a vendor of the associated device and a model of the associated device;
receive a system object identifier of a device that is not recognized by the NAC server and is to be modeled within the NAC server based on implementation details of another device;
retrieve a list of one or more candidate devices from the device database based on the system object identifier;
prompt a user of the NAC server to select a candidate device from the list; and
responsive to receipt of information regarding the selected candidate device, map implementation details of the selected candidate device against the system object identifier and facilitate access to the device using the implementation details of the selected candidate device by storing the mapping in the device database.

23. The non-transitory computer-readable storage medium of claim 22, wherein the instructions further cause the processing resource to test successful modeling of the device by the selected candidate device mapping by reading device information from the device.

24. The non-transitory computer-readable storage medium of claim 23, wherein the device information comprises any or a combination of Media Access Control (MAC) address information, port information, Internet Protocol (IP) address information, Virtual Local Area Network (VLAN) information, host information, Service Set Identifier (SSID) information and Access Point (AP) information.

25. The non-transitory computer-readable storage medium of claim 22, wherein the device comprises any of a switch, a router, an access device, or a network gateway device.

26. The non-transitory computer-readable storage medium of claim 22, wherein the list of one or more candidate devices is retrieved based on a vendor identifier extracted from the system object identifier.

27. The non-transitory computer-readable storage medium of claim 22, wherein the device database is maintained by extracting device mapping information from one or more property files stored in the NAC server.

28. The non-transitory computer-readable storage medium of claim 22, wherein the instructions further cause the processing resource to notify a NAC development team of the NAC server regarding the mapping.

29. The non-transitory computer-readable storage medium of claim 22, wherein the list of one or more candidate devices includes for each of the one or more candidate devices any or a combination of a corresponding system object identifier, a corresponding model name, a corresponding firmware version and mapping information.

* * * * *